United States Patent
Tynan

(10) Patent No.: US 7,661,619 B2
(45) Date of Patent: Feb. 16, 2010

(54) BUCKLER FOR TAPE DRIVES

(75) Inventor: Gerald D. Tynan, Golden, CO (US)

(73) Assignee: Quantum Corporation, San Jose, CA (US)

( * ) Notice: Subject to any disclaimer, the term of this patent is extended or adjusted under 35 U.S.C. 154(b) by 576 days.

(21) Appl. No.: 11/436,268

(22) Filed: May 17, 2006

(65) Prior Publication Data

US 2007/0272782 A1 Nov. 29, 2007

(51) Int. Cl.
*G03B 1/38* (2006.01)
(52) U.S. Cl. .................................. 242/332.4
(58) Field of Classification Search ............... 242/332.4
See application file for complete search history.

(56) References Cited

U.S. PATENT DOCUMENTS

| | | | | |
|---|---|---|---|---|
| 3,134,550 | A * | 5/1964 | Camras | 242/332.1 |
| 4,720,913 | A * | 1/1988 | Hertrich | 29/819 |
| 5,769,346 | A * | 6/1998 | Daly | 242/332.4 |
| 6,092,754 | A | 7/2000 | Rathweg et al. | |
| 6,311,915 | B1 * | 11/2001 | Rathweg | 242/332.4 |
| 6,471,150 | B1 * | 10/2002 | Tsuchiya et al. | 242/332.4 |
| 6,902,128 | B2 * | 6/2005 | Kuhar | 242/332.4 |
| 2002/0100830 | A1 * | 8/2002 | Sasaki et al. | 242/332.4 |
| 2002/0100831 | A1 * | 8/2002 | Sasaki et al. | 242/332.4 |
| 2003/0019968 | A1 * | 1/2003 | Masuda | 242/332.4 |
| 2004/0144878 | A1 * | 7/2004 | Tsuchiya | 242/332.4 |
| 2005/0051653 | A1 * | 3/2005 | Rathweg | 242/332.4 |
| 2005/0279873 | A1 * | 12/2005 | Shimanuki | 242/332.4 |
| 2008/0135663 | A1 * | 6/2008 | Fletcher et al. | 242/332.4 |

* cited by examiner

*Primary Examiner*—Evan H Langdon
(74) *Attorney, Agent, or Firm*—Roeder & Broder LLP; James P. Broder

(57) ABSTRACT

An apparatus includes a holder for a drive leader of a tape drive. The drive leader is for coupling with a buckle attached to tape spooled in a tape cartridge. The holder may rotate about a tower attached to a housing of the tape drive. The apparatus further includes a restraining member for restraining the buckle during coupling with the drive leader. The member may include an elongate body disposed with the post to rotate into a restraining position with respect to the buckle during a buckling operation. The tape drive may include a motor for pulling the tape from the tape cartridge. A method includes restraining a buckle attached to the tape while coupling the drive leader with the buckle. Firmware in the tape drive may coordinate the movements of the holder and the restraining member with operation of the motor and other drive components.

27 Claims, 7 Drawing Sheets

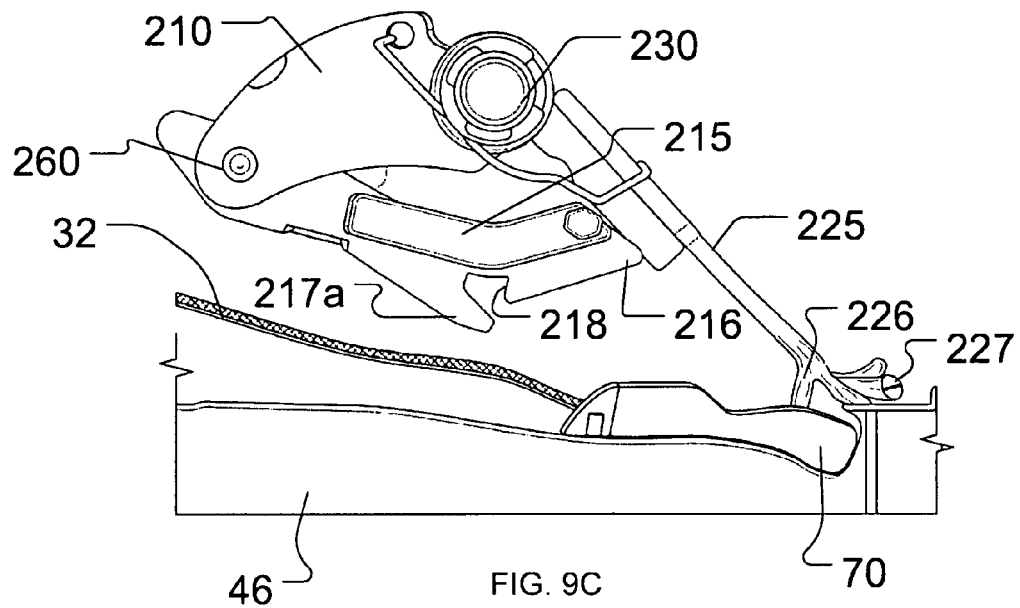
FIG. 9C
FIG. 9D
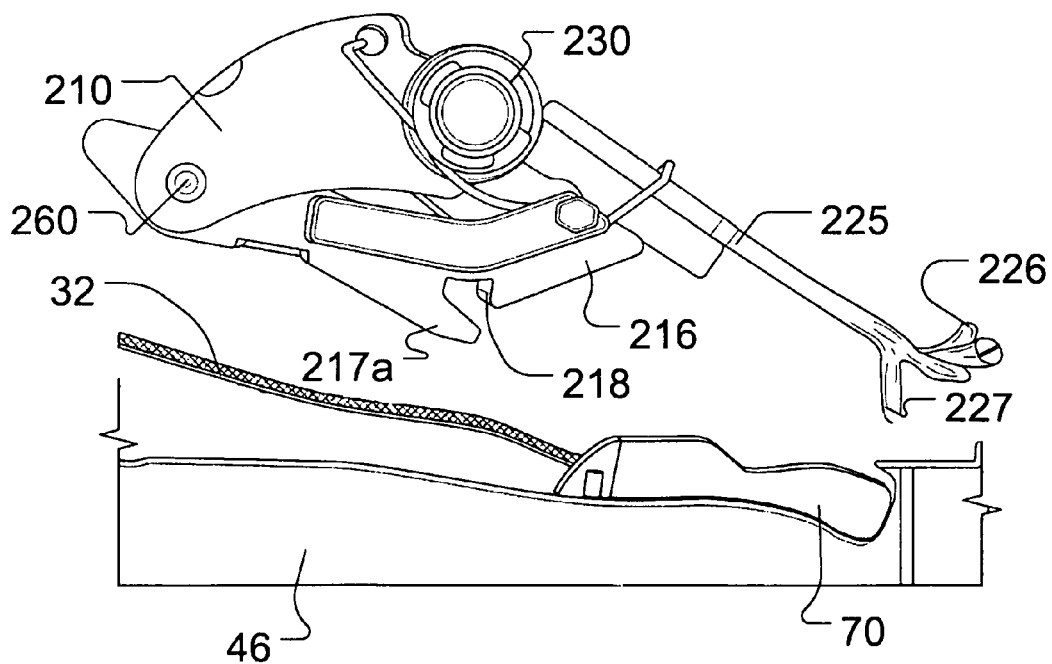

BUCKLER FOR TAPE DRIVES

BACKGROUND

1. Field

The present invention relates generally to tape drives for reading cartridges having tape for magnetically storing data. More specifically, the present invention relates to a tape drive having an improved buckler for buckling and unbuckling a cartridge leader coupled with the storage tape to a drive leader of the tape drive.

2. Related Art

Tape drives are widely used for storing information in digital form. These tape drives commonly use a storage tape having a thin film of magnetic material which receives the information. Typically, the storage tape is moved between a pair of spaced apart reels, past a data transducer to record and/or read back information from the storage tape.

In one type of tape drive system, one of the reels is part of the tape drive, while the other reel is part of a removable cartridge. For this type of tape drive system, the reel that is a part of the tape drive is commonly referred to as a take-up reel, while the reel that is a part of the cartridge is commonly referred to as a cartridge reel. With this system, upon insertion of the cartridge into the tape drive, it is necessary to couple the storage tape on the cartridge reel to the take-up reel of the tape drive. After tape operations, such as reading and/or writing data to the tape, are completed, the storage tape may be uncoupled from the take-up reel prior to removing the cartridge from the tape drive system.

Typically, the storage tape is attached to a cartridge leader that terminates in a buckle, and the take-up reel is coupled to a drive leader that terminates in a buckle pin. The buckle pin is for interfitting with the buckle to complete a "buckling" of the pin and the buckle. The buckling may occur at some point after insertion of the tape cartridge into the tape drive, in an automated buckling process implemented by a buckler.

A prior art buckler 20 is illustrated in FIG. 1. The buckler 20 includes a tube shaped section 110 that pivots on a buckler pin 98. The buckler 20 includes an upper arm 112 and a spaced apart, lower arm (not illustrated) which rotate with the tube shaped section 110 to cantilever ends of the upper arm 112 and the lower arm away from the tube shaped section 110. The buckler 20 includes a second component 102 that is attached to and is operable to rotate relative to the upper arm 112 on a connector pin 104, the rotation causing a tapered lip 118 of the second component 102 to cantilever away from the upper arm 112. A spring 106 biases the second component 102 to swing away from the upper arm 112.

The second component 102 includes a pair of spaced apart buckler retainers 96 (upper buckle retainer identified). The design of the buckler retainers 96 can be varied. In this prior art example, the buckle retainers 96 are designed to hold the buckle pin described above (not illustrated in FIG. 1) near outer edges of the buckle pin. The buckler 20 operates by disposing the buckle pin with the buckle as the components of the buckler 20 rotate and cantilever as described above. Once the buckler 20 has disposed the buckle pin with the buckle, a motor that rotates the cartridge reel operates to pull on the drive leader, which in turn pulls on the buckle, thereby causing the storage tape to be pulled from the cartridge reel. Generally, this action causes complete seating of the buckle pin in the buckle at some point in the tape path. However, this type of buckling operation still fails to complete buckling on occasion, and an improved system and method of buckling is desirable.

SUMMARY

Present inventive aspects include bucklers for tape drives that include a mechanism for reducing movement of a buckle that is coupled with tape spooled on a cartridge reel while a portion of a drive leader is coupled with the buckle.

In one aspect, a buckler for a tape drive comprises a holder for a drive leader that is operable to dispose the drive leader with a buckle of a tape cartridge. The buckler also comprises a member adapted to restrain the buckle during disposition of the drive leader with the buckle.

The member may include a distal portion for disposing proximate to a pin that couples the buckle to a cartridge leader that is in turn coupled with the tape on the tape drive. The distal portion may be for restraining the buckle. The member may also include a depth limiting portion for aiding in positioning of the distal portion. The member may be rotatable into position during a buckling operation.

In another aspect, a method for use in buckling operations in tape drives comprises restraining a buckle coupled to tape spooled on a cartridge reel of a tape cartridge during a disposition of a portion of a drive leader for a coupling with the buckle.

The method above may be implemented under control from program code stored on a computer readable medium. The program code is operable to initiate buckling of a drive leader to a buckle coupled to a tape spooled in a tape cartridge, where the initiation of buckling causing a structure adapted for restraining the buckle to move towards a restraining position. The program code may also be operable to initiate retraction of the structure after a disposition of the drive leader with the buckle, and cause a force to be applied to the drive leader for beginning read and write operations on the tape.

BRIEF DESCRIPTION OF THE DRAWINGS

For a fuller understanding of aspects and examples disclosed herein, reference is made to the accompanying drawings in the following description.

FIGS. 9A-D illustrate top views of the buckler in relation to the buckle of the tape cartridge during various steps of a buckling operation.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed for buckling in a variety of devices. Unless noted otherwise, any system configurations, components, tolerances, design criteria, and the like provided herein are by way of example and illustration rather than limitation.

Figure 2:
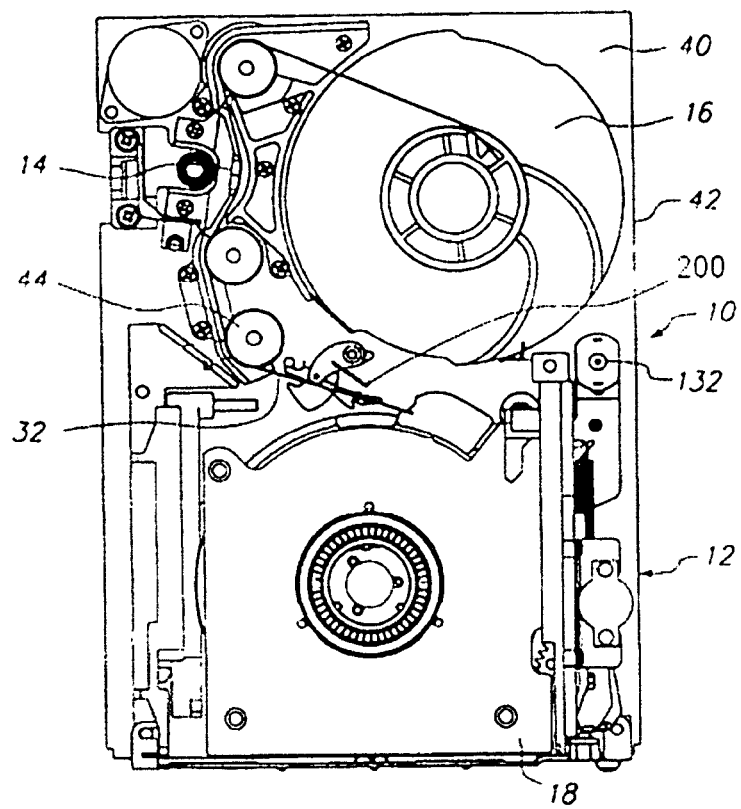
FIG. 2 illustrates a tape drive in which exemplary bucklers according to aspects presented herein may be used.

Referring to FIG. 2, a tape drive 10 having features of the present invention includes a drive housing 12, a data transducer 14, a take-up reel 16, a cartridge receiver 18, and a buckler 200. The tape drive 10 is designed for use in conjunction with a cartridge 22 (FIGS. 3A-B) that includes a cartridge reel 24 and a storage tape (not illustrated) spooled on the cartridge reel 24. The storage tape is coupled with a cartridge leader 255 (FIG. 6) that is in turn coupled with a buckle 28 (FIG. 3B). As provided in detail below, the buckler 200 moves a buckle pin 251 (FIG. 5) coupled with a drive leader 32 (FIGS. 2 & 5) relative to the cartridge 22 to automatically couple and uncouple the buckle 28 to the drive leader 32 by seating the buckle pin 251 in the buckle 28.

The tape drive 10 may be installed within a computer (not shown). Alternately, the tape drive 10 can be used as part of a tape library. The drive housing 12 retains the various components of the tape drive 10. The drive housing 12, illustrated in FIG. 2, includes a base 40, four spaced apart side walls 42 and a cover (not illustrated in FIG. 2 for clarity). The drive housing 12 also includes a cartridge receiver portion 18 for receiving and holding a cartridge. The tape drive 10 includes a plurality of tape rollers 44 (one roller identified) for guiding the storage tape past the data transducer 14 and onto the take-up reel 16. The path of the storage tape through the tape rollers 44, past the data transducer 14 and onto the take-up reel 16 may be referred to as a tape path. A buckle motor 132 is operable to cause rotation of buckler 200, as further described herein.

Figure 3A:
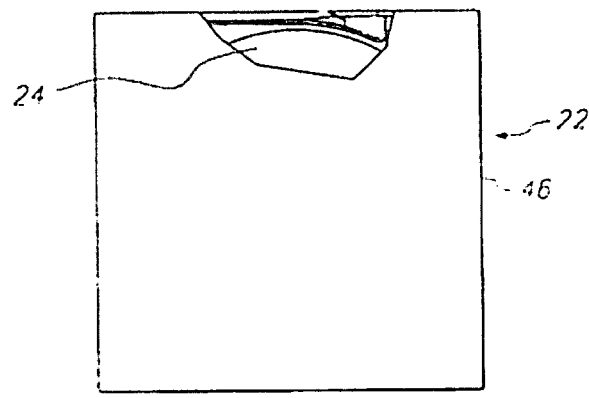
FIG. 3A illustrates a top view of a tape cartridge readable by the tape drive.
Figure 3B:
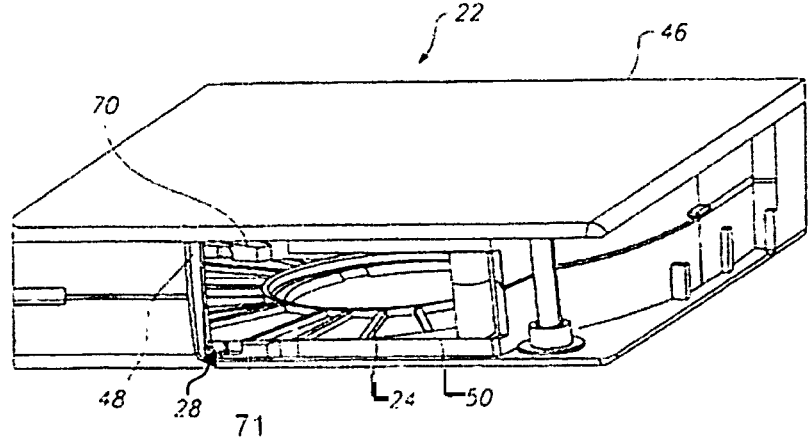
FIG. 3B illustrates a perspective view of the tape cartridge of FIG. 3A.

Referring to FIGS. 3A and 3B, the cartridge 22 includes a substantially rectangular cartridge housing 46 which encloses the cartridge reel 24 and the storage tape (not shown). The cartridge housing 46 includes a cartridge door (not shown for clarity) which pivots between an open door position in which the buckle 28 is exposed and a closed door position. FIGS. 3A and 3B illustrate that the cartridge housing 46 includes a buckle stop 48 positioned near the cartridge reel 24 and a housing opening 50 in the cartridge housing 46. The cartridge stop 48 is sized and positioned to prevent the buckle 28 from retracting onto the cartridge reel 24.

Figure 5:
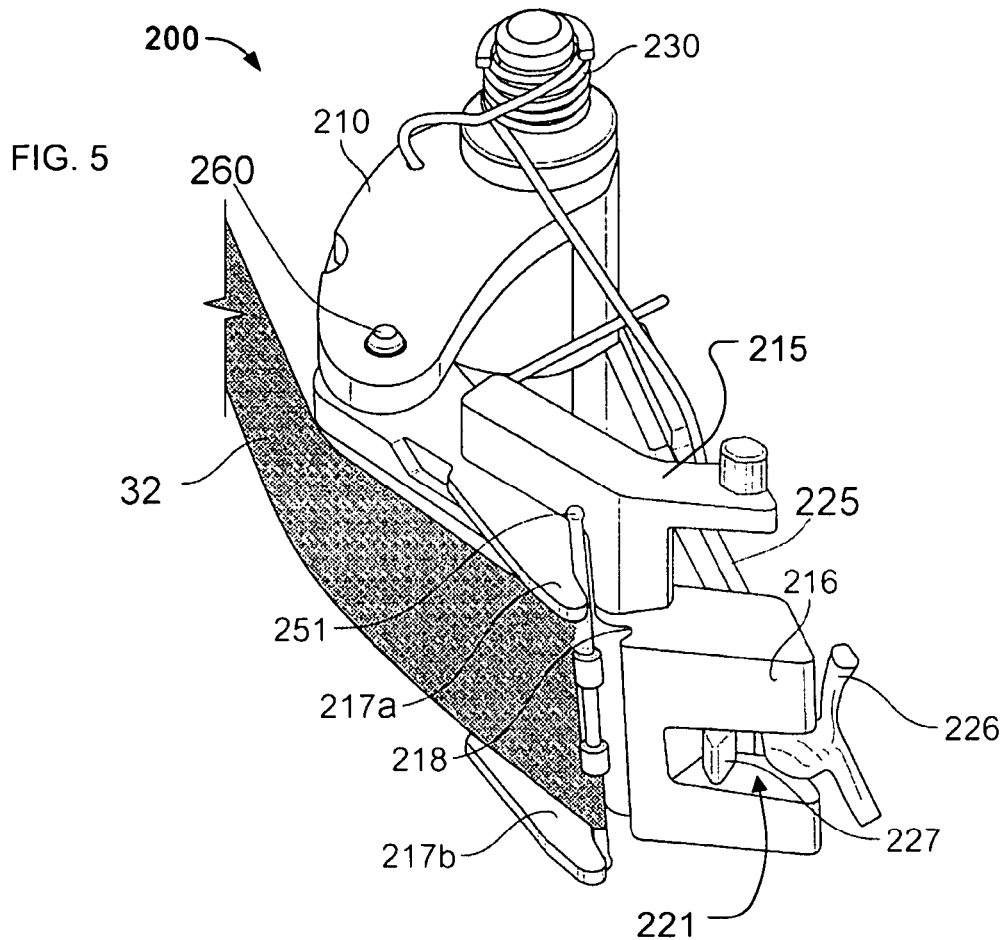
FIG. 5 illustrates another view of the buckler of FIG. 4, wherein the buckler is positioned with a drive leader.

The buckle 28 may be formed from an upper catch 70 and a lower catch 71 (see also FIG. 8), each of upper catch 70 and lower catch 71 have a shape that allows entry from one side of respective ends of a buckle pin 251 (FIG. 5). The shape of the catches 70 and 71 also prevent exit from an opposite side of the buckle pin 251. The catches may be shaped, coupled with the tape leader 255 (FIG. 6), and otherwise disposed for allowing reliable entry of the buckling pin 251 and preventing undesired exit of the buckling pin 251 from the catches 70 and 71.

Figure 4:
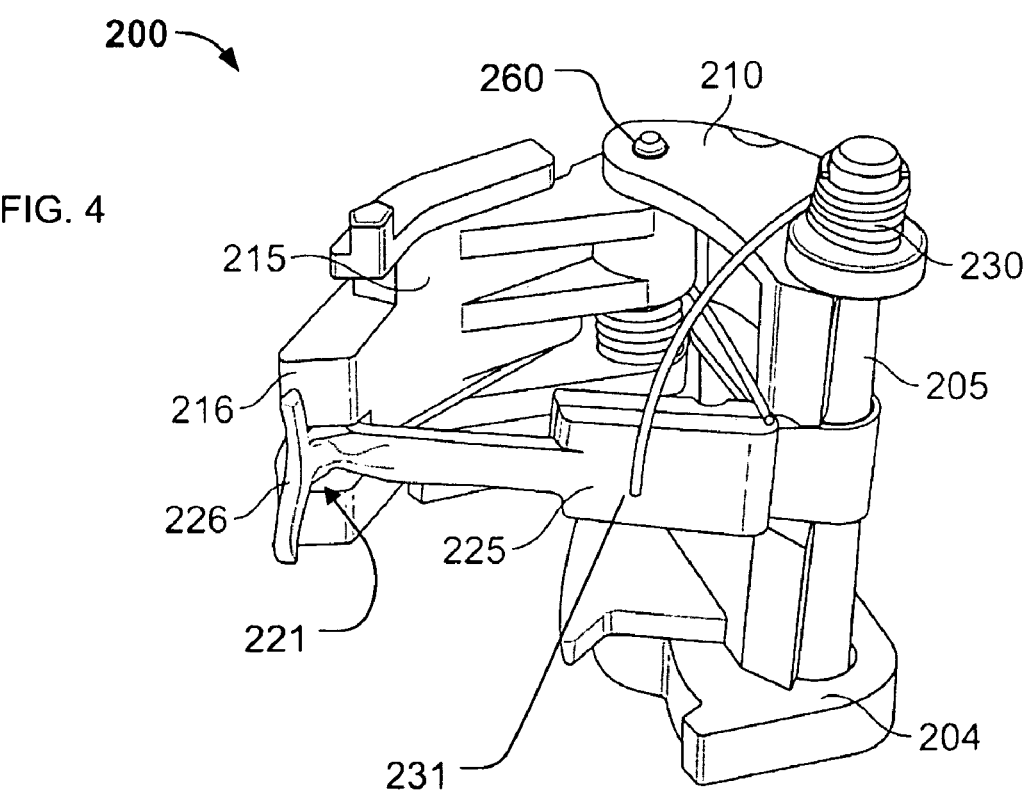
FIG. 4 illustrates a buckler exemplifying inventive aspects presented herein.

Turning to FIG. 4, there is illustrated the exemplary buckler 200 of FIG. 2 in more detail. Buckler 200 includes a base 204 that aids in supporting a tower 205 about which rotatable cam 210 is mounted. Pivot arm 215 is rotatable about pivot pin 260 such that the combined rotating movement of cam 210 and pivot arm 215 provides a rotatably extensible structure for holding the buckle pin 251 (FIG. 5) and for eventually disposing the buckle pin 251 with the buckle 28. As such, the cam 210 and pivot arm 215 are an example of a holder for the buckle pin 251. Various other structures may be devised for holding the buckle pin 251.

An end portion 216 of the pivot arm 215 includes a notch 221, in which is disposed a buckle restraining member 225. The buckle restraining member 225 is rotatably mounted on the tower 205. The presently presented example of the buckle restraining member 225 comprises a depth limiter portion 226 and a distal end portion 227 (illustrated in FIG. 6). The buckle restraining member 225 is urged into the notch 221 by a spring 230. The buckle restraining member 225 may be made from any of a variety of materials including metals and plastics by any of a variety of techniques including but not limited to stamping, molding, and extruding techniques. Portions of the buckle restraining member 225, such as the depth limiter 226 and the distal end 227 may be formed integrally or separate from an arm portion (generally illustrated as 225) that extends from the tower 205. The buckle restraining member 225 may be made in a variety of shapes, including curvilinear shapes In the present example of FIG. 4, the spring 230 is coiled about an upper portion of the tower 205 and includes an end portion that fits against a side of the buckle restraining member 225. In practice, the spring 230 may be implemented in a variety of ways, including for example by coiling the spring internally in the tower and extending the end portion 231 through a hole in the tower, or coiling the spring around the tower between the tower and an inner surface of the restraining member 225. The restraining member 225 may also be pulled from an opposite side to bias the restraining member 225 towards the pivot arm 215 (and into the notch 221). A variety of other mechanisms and techniques for biasing the restraining member 225 according to the presently presented aspects would be within the understanding of one of ordinary skill in the art. An aspect of this biasing includes that the restraining member 225 moves with the pivot arm 215 as the pivot arm 215 rotates away from the restraining member 225 and cantilevers towards the buckle 28, as will be discussed further herein.

Turning to FIG. 5, there is another illustration of the buckler 200, with the drive leader 32 disposed with the buckler 200 and the buckle pin 251 is held by pin catches 217a and 217b. The pin catches 217a and 217b are shaped to retain the buckle pin 251 as pivot arm 215 pivots about pivot pin 260. As pivot arm 215 pivots to sweep out end portion 216, buckle pin 251 moves with the pivot arm 215. At a point in this movement, the buckle pin 251 and the pin catches 217a and 217b will no longer be in contact as the force that was holding them in contact is instead directed to causing the buckle in 251 to move into a recess 218. The recess 218 aids in keeping the buckle pin 251 in place as the buckling operation progresses. The recess may also force buckle pin 251 into upper and lower catches 70 and 71

Figure 6:
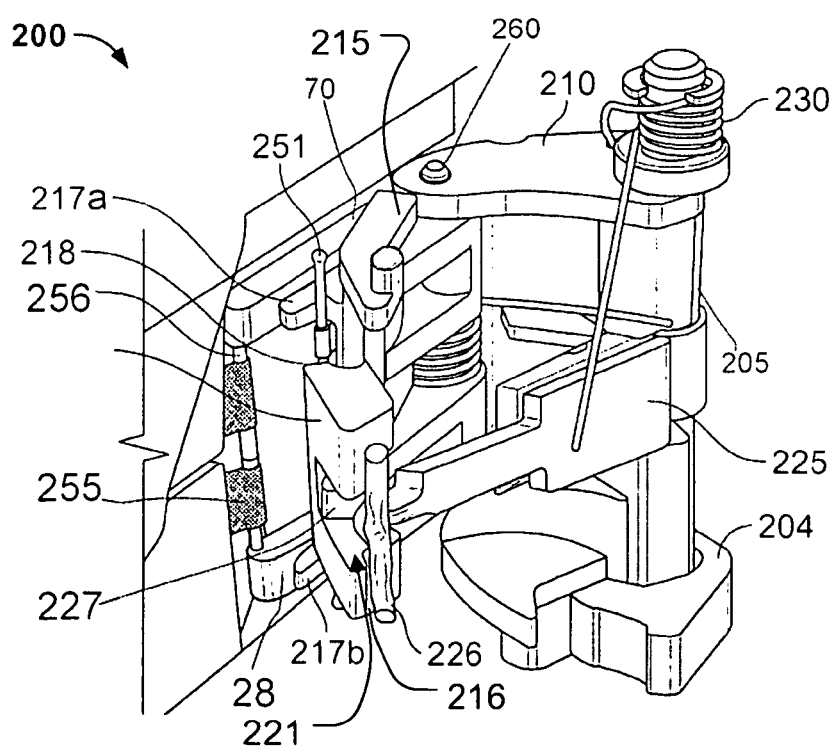
FIG. 6 illustrates a view of the exemplary buckler in relation to a tape cartridge prior to disposing the drive leader with a buckle from the tape cartridge.

In FIG. 6, the buckler 200 is further illustrated in a perspective view in relation to the tape cartridge 22 at a time early in the buckling operation. In the present illustration, the tape leader 255 is coupled with the buckle 28 through a tape leader pin 256 that is in turn secured in each of the upper catch 70 and the lower catch 71. The tape leader 255 may be coupled with the buckle 28 by looping portions of the tape leader around the tape leader in 256 and fixing that looped material back on itself. FIG. 5 also illustrates that the restraining member 225 is biased against the pivot arm 215 such that the restraining member 225 will sweep into position for restraining the buckle 28 before the buckle pin 251 is disposed with the buckle 28.

Figure 7:
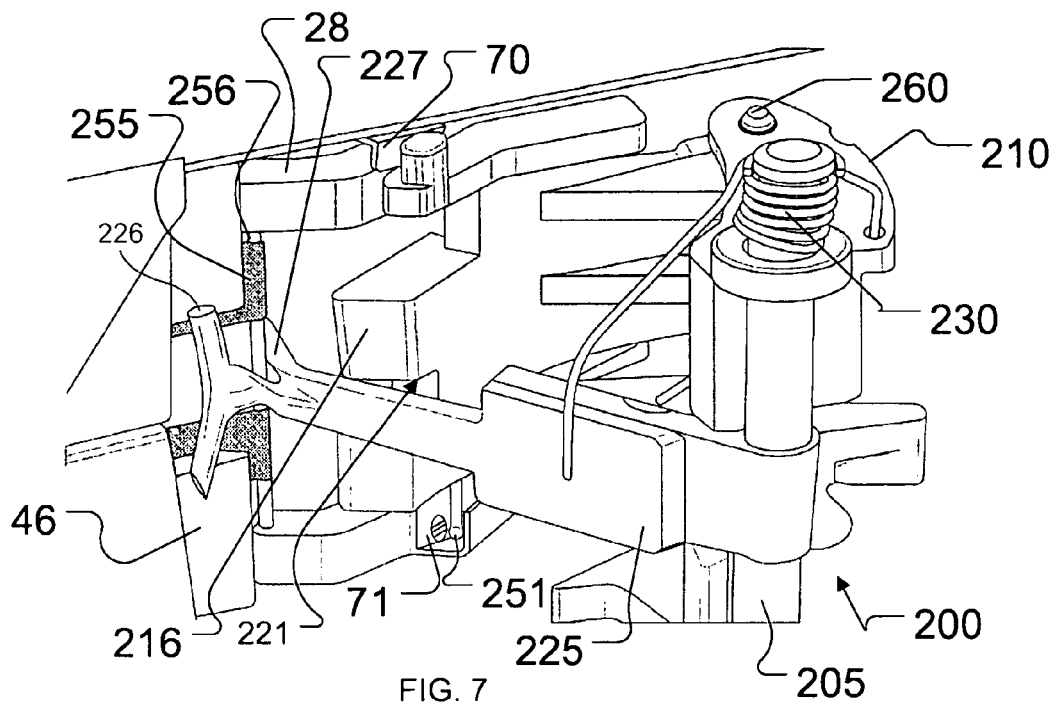
FIG. 7 illustrates a view of the buckler in relation to the tape cartridge during disposition of the drive leader with the buckle of the tape cartridge.

FIG. 7 illustrates the buckler 200 in position to restrain the buckle 28 by being positioned with respect to the cartridge pin 256 such that a movement in a direction similar to the direction of the pivot arm 215 would be restricted or otherwise limited. FIG. 7 also illustrates the buckle pin 251 of the drive leader entering the lower catch 71 of buckle 28. The upper catch 70 is also illustrated, and would be receiving an upper portion of the buckle pin 251. The depth limiting portion 226 of the restraining member 225 rests against a portion of the housing 46 of the tape cartridge 22. The depth limiting portion 226 aids in positioning the distal end portion 227 with the cartridge pin 256.

Other implementations of the restraining member 225 may omit the depth limiting portion 226 in that the distal end portion 227 may be controlled in positioning such that the depth limiting portion 226 of the restraining member is not needed. Still other examples may have a modified depth limiting portion that can take any of a variety of shapes. For example, the depth limiting portion may include an end more similar to the distal end 227 that would push against a portion of the housing 46 available between side portions of the tape leader 255. Such details and a variety of other selections would be within the scope of understanding of those of ordinary skill in the art.

In the context of these exemplary aspects, restraining the buckle 28 includes reducing or otherwise limiting play in the buckle 28 as the buckle pin 251 is disposed in the buckle 28. Restraining the buckle 28 may also be more generally viewed as providing a counteracting force to the force exerted on the buckle as the buckler 200 sweeps through, depositing the buckle pin 251 with the buckle 28. Restraining the buckle 28 may also include counteracting force exerted on the buckle through the drive leader 32 by the take-up motor of the tape drive 10, in circumstances where the take-up motor is controlled to aid in buckling by pulling on the drive leader 32 while the buckle 28 is restrained. As such, restraint of the buckle need not be complete or otherwise absolute because a purpose of restraining the buckle may be fulfilled even though the buckle 28 may move to some extent during deposition of the buckle pin 251 with the buckle 28.

Figure 1:
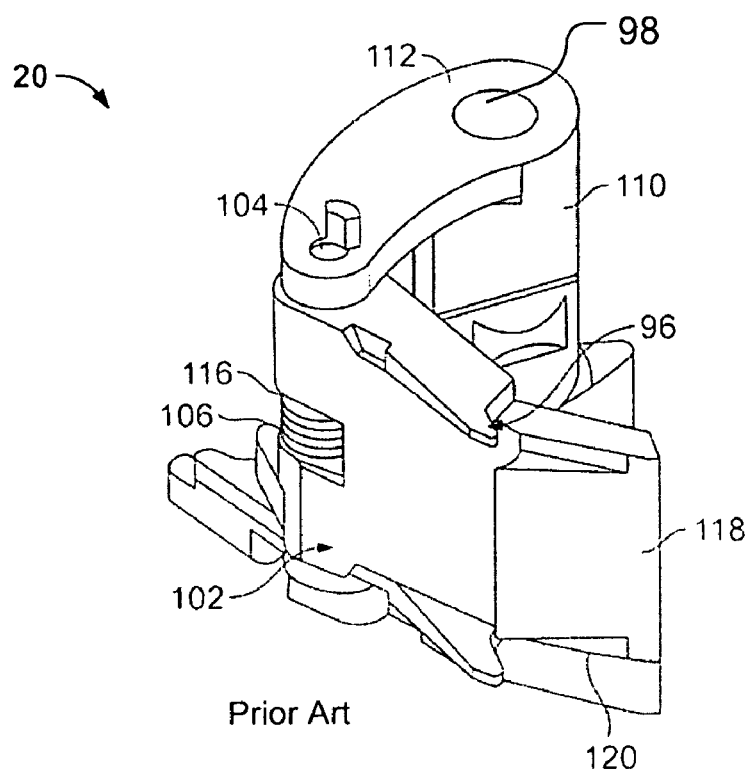
FIG. 1 illustrates a prior art buckler.

In contrasting buckler 200 with the prior art buckler 20, illustrated in FIG. 1, buckling, if using buckler 20, would often be completed only after the take-up reel motor was activated to pull the tape from the cartridge reel 24 and the buckle 28 had proceeded in the tape path to move around at least one of the rollers 44 (FIG. 2). In present examples, buckling may be completed as the buckle pin 251 is disposed with the buckle 28, under the force of the buckler 200, and without requiring involvement of the take-up reel motor. Recess 218 may be formed with an edge angle that provides increased force during buckling, such an edge angle would generally be closer to perpendicular with the buckle. However, the edge angle should provide for a ramp to allow the buckle pin 251 to leave the recess 218 as the pivot arm 215 continues to sweep across the tape cartridge 22 and the buckle 28. The take-up reel motor may be used as well in buckling operations according to present examples. For instance, the take-up reel motor may be activated while restraining member 225 is in place for restraining the buckle 28, which may further ensure a complete buckling before movement of the storage tape from the cartridge reel 24.

Figure 8:
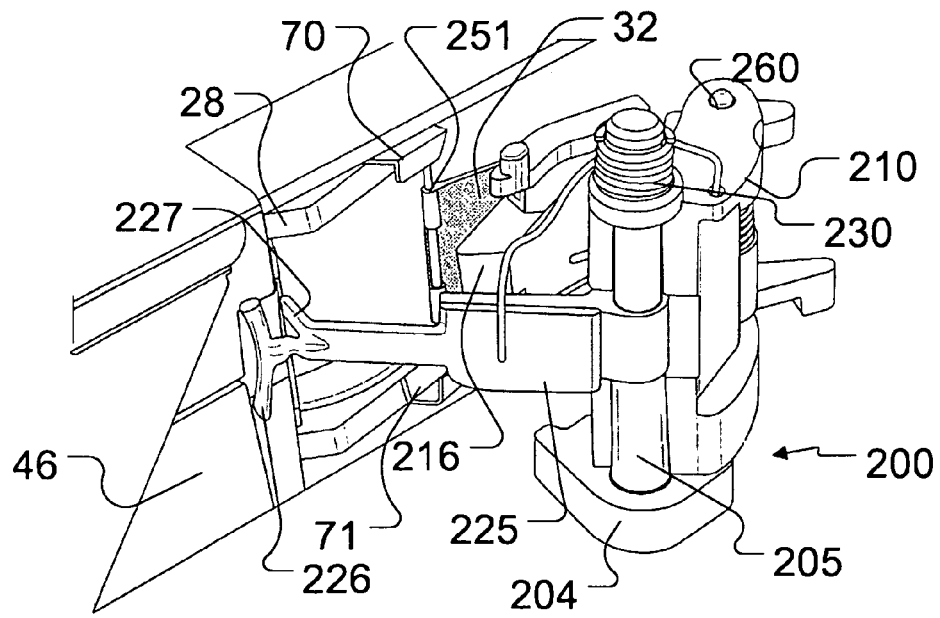
FIG. 8 illustrates a view of the buckler in relation to the tape cartridge after disposition of the drive leader with the buckle.

FIG. 8 illustrates the buckler 200 with respect to the cartridge housing 46 after disposal of the buckle pin 251 with the buckle 28 and the buckle pin 251 has disengaged from the recess 218. As illustrated, by virtue of the path of travel of the cam 210 (to the right and away from buckle 28), the pivot arm 215 has been moved away from the buckle 28 to some extent such that the pivot arm 215 would not interface with movement of the buckle 28 through the tape path. In this movement, as the pivot arm 215 moves away, the notch 221 again contacts restraining arm 225 and causes the restraining arm 225 to move away from restraining the cartridge pin 256, as will be discussed in more detail with regard to FIGS. 9C-D. In an unbuckling movement, the basic steps described above may be reversed such that the restraining member 225 moves into place for restraining the buckle 28, and the pivot arm 215 sweeps from the other direction such that pin catches 217*a* and 217*b* catch the buckle pin 251 and remove the buckle pin 251 from the buckle 28.

Figure 9A:
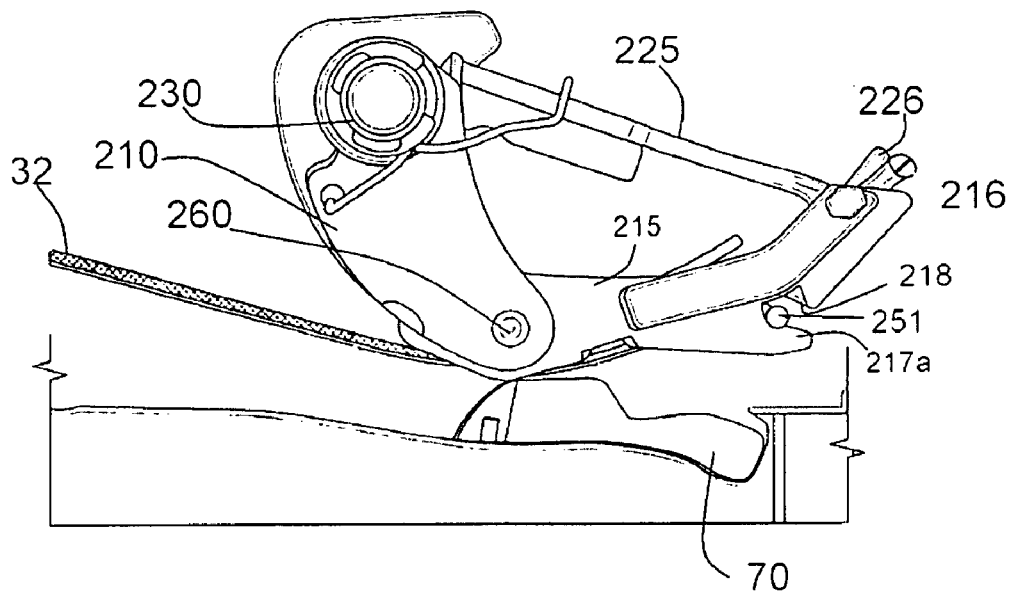

FIGS. 9A-D each illustrates a top view at a different point during a buckling operation. FIG. 9A illustrates buckler 200 proximate a beginning position of the buckling operation. Pin catch 217*a* has pin 251 as the buckler 200 sweeps out towards the housing 46 for disposing the buckle pin 251 with the buckle 28 (only the top portion 70 identified). The restraining member 225 fits in notch 221 (FIGS. 6-7). The drive leader 32 is illustrated as wrapping around an outer portion of cam 210.

Figure 9B:
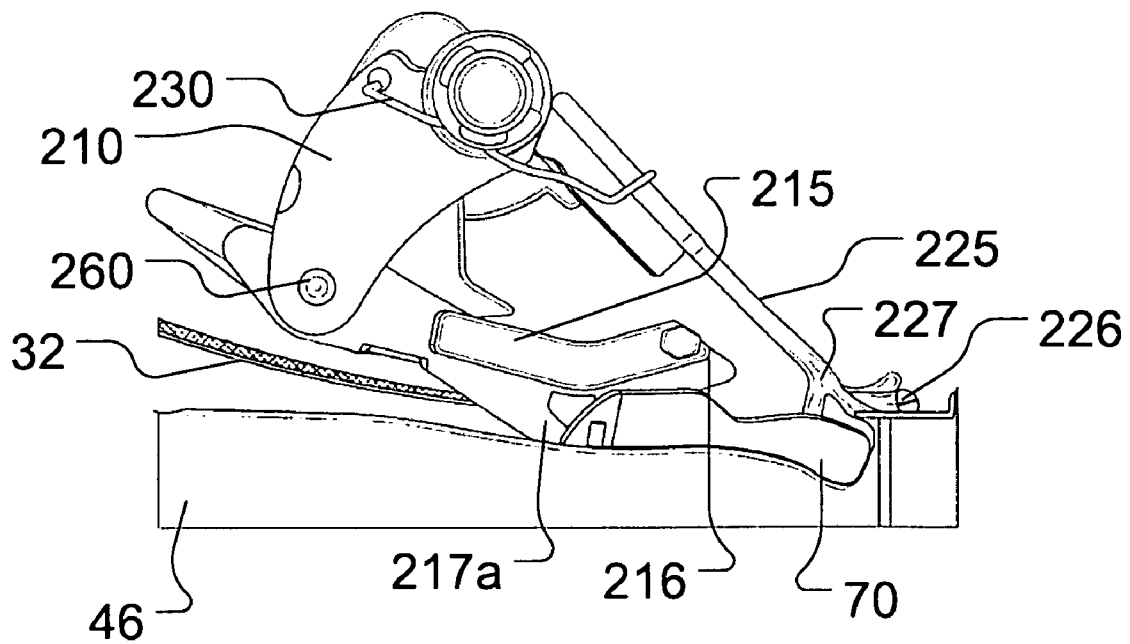

FIG. 9B then illustrates that the restraining member 225 is positioned to place the distal end 227 with respect to the buckle 28 to restrain the buckle 28 as the buckle pin 251 is disposed with the buckle 28. The depth limiter 226 is illustrated in contact with a portion of the housing 46. As can be discerned, depth limited 226 could be any of a variety of shapes and still perform its positioning function in the present example.

FIG. 9C illustrates that the buckle pin 251 has been disposed with the buckle 28 (again, only top portion 70 identified). The pivot arm 215 has then been moved away from the buckle 28 by virtue of the cam 210 continuing to rotate around tower 205 (FIGS. 7-8). FIG. 9D illustrates that the pivot arm 215 moves away from buckle 28, thereby moving the restraining member 225 away from the buckle 28. Unbuckling the buckle pin 251 from the buckle 28 may occur in an unbuckling operation that is substantially a reversal of the buckling operation.

Figure 10:
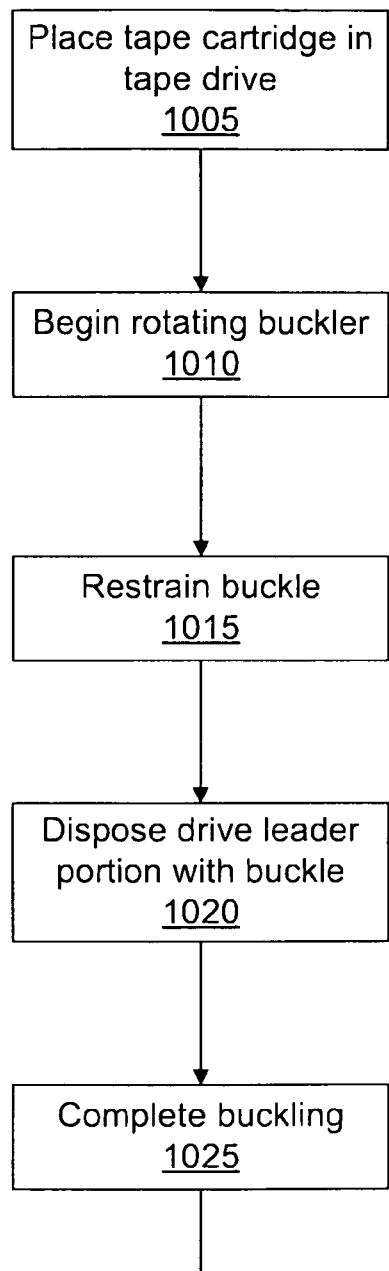
FIG. 10 illustrates method steps of buckling and unbuckling implemented by bucklers according to aspects presented herein.
Figure 10:
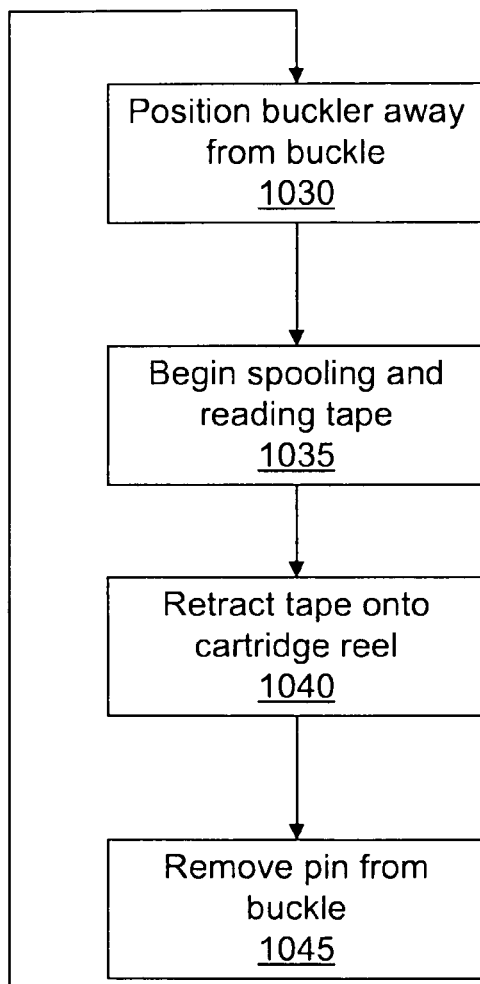

FIG. 10 illustrates exemplary steps that occur during reading and/or writing of a tape in a tape drive incorporating a buckler according to exemplary aspects presented herein. In 1005, a tape cartridge is placed in the drive (e.g, drive 10). For brevity, steps relating to opening any access doors or other protective devices are omitted. The drive 10, having access to buckle 28, begins to rotate buckler 200 into position for sweeping pivot arm 215 across the buckle 28. Meanwhile, the restraining member 225 is biased against the pivot arm 215 such that as the pivot arm begins to sweep across buckle 28, the pivot arms moves (1015) into a position to restrain the buckle 28. At 1020, the pivot disposes the buckle pin 251 of the drive leader (in this example) with the buckle 28. As this disposition occurs, the notch 218 provides some force on the buckle pin 251 to urge the buckle pin 251 into a full buckling with the buckle 28, and buckling is completed at 1025. Step 1025 may include providing force on the buckle pin 251 through the drive leader 32 by the take-up reel motor, as well as providing a reverse force on the buckle 28 through the cartridge reel motor.

At 1030, the pivot arm moves away from the buckle 28, and by virtue of this movement pushes the restraining arm 225 away from the buckle 28. The take-up reel motor may then begin operation at 1035 by pulling storage tape from the cartridge 22. After completion of read and/or write operations (not separately illustrated), the tape may be retracted by the cartridge reel motor back onto cartridge reel 24. The buckle pin 251 may then be removed from buckle 28 by an unbuckling operation that may essentially include reversing the steps of buckling.

Steps of the above methods as well as other control functions described with regard to the tape drive, such as control of various motors and other actuators in the tape drive 10 may be controlled by program code that is stored on media in the tape drive 10. For example, there may be a programmable memory, such as an EEPROM or a Flash memory device that contains code (typically called firmware) for sequencing, synchronizing, and otherwise controlling features of the tape drive 10 that are controllable. For example, the programmable memory may contain code that sequences operations such as the beginning of the buckling movement and the beginning of rotation of the take-up reel motor, as well as other functions such as how much torque should be applied to the take-up reel motor at any given time. The program code may control the actuators and motors through devices known in the art, such as pulse width modulating controllers, and the like.

Further description relating to bucklers, such as buckler 20 (FIG. 1) and buckling operations may be found in U.S. Pat. No. 6,092,754, entitled "Buckler for a tape drive," which is commonly owned with the present application and incorporated herein by reference in its entirety.

This description is exemplary and it will be apparent to those of ordinary skill in the art that numerous modifications and variations are possible. For example, various exemplary methods and systems described herein may be used alone or in combination with various other tape drive features. Additionally, particular examples have been discussed and how these examples are thought to address certain disadvantages in related art. This discussion is not meant, however, to restrict the various examples to methods and/or systems that actually address or solve the disadvantages.

I claim:

1. A buckler for a tape drive, the buckler comprising:
   a holder for a drive leader, the holder operable to dispose the drive leader with a buckle of a tape cartridge, the holder including a cam that is mounted on and rotates relative to a tower and a pivot arm that rotates relative to the cam about a pivot pin; and
   a member adapted to restrain the buckle during disposition of the drive leader with the buckle, the member being rotatably mounted on the tower.

2. The buckler of claim 1, wherein the member is operable to restrain the buckle from prior to an initial contact between a portion of the drive leader and the buckle until after a separation of the drive leader from the holder.

3. The buckler of claim 2, wherein the portion of the drive leader includes a buckler pin having a first end and a second end, the buckler pin adapted to fit the first end and the second end into an upper catch and a lower catch of the buckle, respectively.

4. The buckler of claim 1, wherein the member is rotatable about a tower post about which the holder pivots during the disposition of the drive leader with the buckle.

5. The buckler of claim 1, wherein member further comprises a depth limiter structure for aiding in positioning of a restrainer portion of the member with the buckle of the tape cartridge.

6. The buckler of claim 5, wherein the restrainer portion of the member operates by restraining movement of a pin that couples the buckle to a tape leader.

7. The buckler of claim 1, further comprising a spring operable to urge the member into disposition with the buckle.

8. The buckler of claim 1, wherein the holder comprises a portion operable to rotate about a tower post and cantilever towards the buckle during a buckling operation, the member movable into a restraining position with respect to the buckle during the buckling operation.

9. The buckler of claim 1, wherein the member resists force on the buckle from the holder.

10. The buckler of claim 1, wherein the member, when in a restraining position with respect to the buckle, pushes the buckle towards a wall of a housing of the tape cartridge.

11. The buckler of claim 1, wherein the holder is retractable after disposition of the tape drive leader with the buckle, and the retraction of the holder pushes the member away from the buckle.

12. The buckler of claim 1, wherein the drive leader comprises a pin coupled with a flexible leader portion, and the pin is pushed by a recess in the holder into the buckle.

13. The tape drive for reading tape cartridges, comprising a buckler according to claim 1.

14. The tape drive of claim 13, further comprising a motor for causing rotation of the buckler to move the buckler into disposition with the buckle.

15. The tape drive of claim 14, further comprising a take-up reel, and a reel motor operable to rotate the take-up reel.

16. A method for use in buckling operations in tape drives, comprising:
   disposing a drive leader with a buckle of a tape cartridge with a holder including a cam that is mounted on and rotates relative to a tower and a pivot arm that rotates relative to the cam about a pivot pin; and
   restraining the buckle with a member that is rotatably mounted on the tower during a disposition of a portion of the drive leader for a coupling with the buckle.

17. The method of claim 16, wherein the portion of the drive leader includes a buckling pin for interfitting with the buckle.

18. The method of claim 16, further comprising applying a force to the drive leader while restraining the buckle.

19. The method of claim 16, further comprising applying a force to the buckle through a holder of a drive leader during a buckling operation.

20. The method of claim 19, further comprising rotating a take-up reel after applying the force.

21. The method of claim 16, wherein restraining the buckle includes rotating a restraining member into a position for effecting the restraint of the buckle.

22. The method of claim 21, further comprising reversing rotation of the restraining member after disposing the drive leader with the buckle.

23. The method of claim 22, wherein disposing the drive leader with the buckle includes rotating and extending a holder for the drive leader into a proximity of the buckle.

24. The method of claim 23, wherein the rotating and extending of the holder occurs with the rotation of the restraining member.

25. A computer readable medium comprising program code, the program code operable to:
   initiate buckling of a drive leader to a buckle coupled to a tape spooled in a tape cartridge, the initiation of buckling causing a structure that is rotatably mounted on a tower and is adapted for restraining the buckle to move towards a restraining position;
   continue buckling of the drive leader to the buckle by moving a holder that is rotatably mounted on the tower to dispose the drive leader with the buckle;

initiate retraction of the structure after a disposition of the drive leader with the buckle; and cause a force to be applied to the drive leader.

26. The computer readable medium of claim 25, wherein the program code sequences initiation of the retraction and application of the force such that buckling is expected to be complete before the buckle contacts a first roller of a tape drive in which the tape cartridge is inserted.

27. The computer readable medium of claim 25, wherein the program code is stored in a memory disposed in a tape drive.

* * * * *

UNITED STATES PATENT AND TRADEMARK OFFICE
CERTIFICATE OF CORRECTION

PATENT NO. : 7,661,619 B2  Page 1 of 1
APPLICATION NO. : 11/436268
DATED : February 16, 2010
INVENTOR(S) : Gerald D. Tynan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Thirtieth Day of November, 2010

David J. Kappos
*Director of the United States Patent and Trademark Office*